United States Patent Office 3,635,876
Patented Jan. 18, 1972

3,635,876
THERMOPLASTIC MATERIAL COMPOSITIONS
Jean Chameroy, Guyancourt, France, assignor to Societe
Anonyme Groupement Atomique Alsacienne Atlantique
(G.A.A.A.), Le Plessis-Robinson, France
No Drawing. Continuation of application Ser. No.
594,703, Nov. 16, 1966, which is a continuation-in-part of application Ser. No. 524,831, Feb. 3,
1966. This application Aug. 6, 1969, Ser. No.
849,288
Claims priority, application France, Nov. 19, 1965,
39,137
Int. Cl. C08g 37/04; C08f 29/12; G01t
U.S. Cl. 260—37
5 Claims

ABSTRACT OF THE DISCLOSURE

A termoplastic composition is provided having a response equivalent to $\beta$, $\gamma$ and X radiations and neutrons equivalent to that of organic tissue. The composition contains (1) about 55 to 70% by weight of polypropylene or polyethylene (2) 10 to 15% by weight of polyacetal and (3) 20 to 30% by weight of magnesium oxide or hydroxide; or, (1) the same amount of polypropylene or polyethylene (2) 15 to 25% of polyacetal and (3) 15 to 20% of alumina.

---

This application is a continuation of application Ser. No. 594,703, filed Nov. 16, 1966, now abandoned, which is a continuation-in-part of application Ser. No. 524,831, filed Feb. 3, 1966, now abandoned.

The invention relates to a new and useful thermoplastic material composition having a responsive equivalent to that of organic tissues with respect to $\beta$, $\gamma$, and X radiations as well as to neutrons.

It is known that, in order to measure the dose of nuclear radiations absorbed into the tissues of a human system, radiation monitors such as ionisation chambers, counters, dosage meters or other measuring apparatus are used. As can be understood, it is indispensable that these apparatus should provide an indication independent of the radiation energy. In other words, the energy absorbed into the tissues and that absorbed by the detector should have a constant ratio, independent of the radiation energy in a very broad energy spectrum. In particular, the energy absorption coefficient in organic tissues and the absorption coefficient in the detector means should be the same whatever the radiation energy.

The main object of this invention is therefore to provide a material composition having a response equivalent to that of organic tissues for $\beta$, $\gamma$ and X radiations of whatever energy and for fast neutrons, and furthermore, which possesses improved mechanical and thermal properties with respect to materials proposed hitherto.

The material composition according to the invention is a mixture of three components, to wit (a) polypropylene or polyethylene or a mixture of said substances, (b) polyoxymethylene also called polyacetal, and (c) a mineral filler, being magnesium oxide or hydroxide, or aluminum oxide $Al_2O_3$ in such proportions that the percentage of hydrogen in the total mixture, by weight, is substantially equal to that existing in the tissues of a human system, i.e. about 10.2%.

It is known that polypropylene can be represented by the general formula:

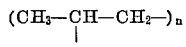

where $n$ is an integer, and that polyoxymethylene or polyacetal has the general formula:

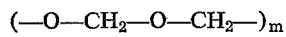

wherein $m$ is an integer. Said two compounds are plastics which are sufficiently compatible in combination, both possessing good mechanical qualities, especially a tensile strength of form 3 to 7 kg./mm.², and good thermal stability, as they resist satisfactorily the continuous effects of temperatures in the range of 140° C.

The third component of the material according to the invention is a filler which can be either magnesium oxide (or calcined magnesia) MgO, or magnesium hydroxide (or magnesium hydrate) $Mg(OH)_2$, or aluminum oxide (or alumina) $Al_2O_3$.

When aluminum oxide is used as a filler, the percentage of said filler in the mixtures, by weight, is smaller that when magnesium oxide or hydroxide is used, but the percentage of polyacetal should then be higher.

Thus, the useful range of percentages by weight in a mixture comprising magnesium oxide or hydroxide is 55 to 70% polypropylene or polyethylene, 10 to 15%—polyacetal, and 20 to 30% magnesium compound.

In the case of aluminum oxide filler, the mixture should contain, by weight, 55 to 70% polypropylene or polyethylene, 15 to 25% polyacetal, and 15 to 20% aluminum oxide.

Examples of preferred materials according to the invention are given herein after, all percentages being by weight and the components used being commercial products.

EXAMPLE 1

A composition was obtained by intimately mixing the following ingredients:

The material according to the invention is easy to make and use by the usual methods of working and forming thermoplastic materials, especially by moulding.

| | Percent |
|---|---|
| Polypropylene | 65.2 |
| Polyacetal | 12.2 |
| Magnesium oxide (MgO) | 22.6 |

This composition contains 10.2% hydrogen, that is to say, the proportion existing in the tissues of the system, and therefore has the same response for fast neutrons. In as far as $\gamma$ and X radiations are concerned the energy mass absorption factor for photons of from 10 kev. to 10 mev. is the same within 2% for the said composition and for the tissues of the system.

EXAMPLE 2

Equivalent results were obtained with the following composition.

| | Percent |
|---|---|
| Polypropylene | 58.2 |
| Polyacetal | 12.2 |
| $Mg(OH)_2$ | 29.6 |

This composition has the advantage that the deviation in mass absorption factor mentioned in Example 1 is less than 2% but has the inconvenience of being more brittle, which leads to its being used preferably in applications where considerable thickness of material should be used.

EXAMPLE 3

Similar results as in Example 1, from the point of energy absorption were obtained with the following composition:

| | Percent |
|---|---|
| Polyethylene | 65.2 |
| Polyacetal | 12.2 |
| MgO | 22.6 |

The material obtained, which has improved flexibility but the mechanical and thermal properties of which are less satisfactory, may be used for certain applications where conditions of use are less rigorous.

EXAMPLE 4

The same results as in Example 1 were obtained with the following composition:

| | Percent |
|---|---|
| Polypropylene | 61.7 |
| Polyacetal | 19.6 |
| $Al_2O_3$ | 18.7 |

In this case, the quantity of mineral filler in the final composition is relatively low, whereby the mechanical qualities are improved and the moulding of finished articles made easier.

It is clear that various modifications may be made in the foregoing examples without departing from the scope of the invention as defined in the following claims.

What I claim is:

1. A thermoplastic composition consisting essentially of a mixture of (a) 55 to 70% by weight of a polyolefine selected from the group consisting of polypropylene and polyethylene, (b) polyacetal and (c) an oxide mineral filler selected from the group consisting of (1) magnesium oxide and hydroxide or combination thereof and (2) aluminum oxide; the percentage by weight of (b) being 10 to 15% when (c) is (1), the percentage of (c) by weight then being 20 to 30% and the percentage by weight of (b) being 15 to 25% when (c) is (2), the percentage of (c) by weight then being 15 to 20%, and the respective percentages of (a), (b), and (c) being such that the percentage of hydrogen in the total mixture, by weight, is substantially equal to that existing in the tissues of a human system; said polyolefin and said polyacetal having a tensile strength between about 3 and 7 kg./mm.$^2$ and heat stability up to about 140° C.; and, said composition being a radiation detector having a response equivalent to that of organic tissue with respect to $\beta$, $\gamma$ and X radiations and neutrons between about 10 kev. and 10 mev.

2. A composition as claimed in claim 1, consisting of, by weight, 65.2% polypropylene, 12.2% polyacetal and 22.6% magnesium oxide MgO; said composition having a mass absorption coefficient for photons within 2% of that of the human tissue system at energy levels between about 10 kev. and 10 mev.

3. A composition as claimed in claim 1, consisting of a mixture of, by weight, 58.2% polyethylene, 12.2% polyacetal and 29.6% magnesium hydroxide $Mg(OH)_2$.

4. A composition as claimed in claim 1, consisting of a mixture of, by weight, 61.7% polypropylene, 19.6% polyacetal, and 18.7% aluminum oxide $Al_2O_3$; said composition having a mass absorption coefficient for photons within 2% of that of the human tissue system at energy levels between about 10 kev. and 10 mev.

5. A composition as claimed in claim 1, consisting of a mixture of, by weight, 61.7% polypropylene, 19.6% polyacetal and 18.7% aluminum oxide $Al_2O_3$.

References Cited

UNITED STATES PATENTS

| 2,888,424 | 5/1959 | Precopio et al. | 260—41 |
| 3,238,163 | 1/1966 | O'Neill et al. | 260—23 |
| 3,321,426 | 5/1967 | Dorsey | 260—28.5 |

FOREIGN PATENTS

| 245,696 | 7/1963 | Australia | 260—897 |
| 1,011,710 | 6/1966 | England | 260—37 ALO |

OTHER REFERENCES

"Tissue-Equivalent Ionization Chambers," Rossi, H. A. and G. Failla, Nucleonics, February 1956, pp. 32–37 relied on.

ALLAN LIEBERMAN, Primary Examiner

SAMUEL L. FOX, Assistant Examiner

U.S. Cl. X.R.

250—83.6; 260—41, 897